United States Patent
Kao et al.

(10) Patent No.: US 8,290,955 B2
(45) Date of Patent: Oct. 16, 2012

(54) CLASSIFICATION OF DATA IN A HIERARCHICAL DATA STRUCTURE

(75) Inventors: I-Lung Kao, Round Rock, TX (US); Daniel P Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 12/212,794

(22) Filed: Sep. 18, 2008

(65) Prior Publication Data

US 2010/0070505 A1    Mar. 18, 2010

(51) Int. Cl.
*G06G 7/00* (2006.01)
*G06F 17/30* (2006.01)

(52) U.S. Cl. .......................................................... 707/737
(58) Field of Classification Search .................... 707/737
See application file for complete search history.

(56) References Cited

U.S. PATENT DOCUMENTS

| | | | | |
|---|---|---|---|---|
| 6,092,064 A * | 7/2000 | Aggarwal et al. | ............. | 707/694 |
| 6,594,391 B1 * | 7/2003 | Quadranti et al. | ............. | 382/203 |
| 6,871,201 B2 * | 3/2005 | Yu et al. | ............. | 707/737 |
| 7,584,159 B1 * | 9/2009 | Chakrabarti et al. | ............. | 706/45 |
| 2004/0254941 A1 * | 12/2004 | Westendorf et al. | ............. | 707/100 |
| 2006/0248055 A1 * | 11/2006 | Haslam et al. | ............. | 707/3 |
| 2006/0248094 A1 * | 11/2006 | Andrews et al. | ............. | 707/100 |
| 2008/0034402 A1 * | 2/2008 | Botz et al. | ............. | 726/1 |

OTHER PUBLICATIONS

U.S. Appl. No. 12/101,303, filed Apr. 11, 2008, entitled "Data Management in a Computer System" by Daniel P. Kolz et al.
U.S. Appl. No. 12/101,318, filed Apr. 11, 2008, entitled "Classification of Data Based on Previously Classified Data" by Daniel P. Kolz et al.

* cited by examiner

*Primary Examiner* — Robert Beausoliel, Jr.
*Assistant Examiner* — Michael Pham
(74) *Attorney, Agent, or Firm* — Patterson & Sheridan, LLP (57) ABSTRACT

Embodiments of the invention are generally related to data security, and more specifically to data classification. The nodes of a hierarchical data structure may be displayed in a graphical user interface (GUI). The GUI may be configured to receive selection of a data classification type. Upon receiving a selection of a data classification type, a probability of a node containing data objects that may be classified as the selected data classification type may be displayed adjacent to the node, thereby allowing efficient location and classification of the data objects.

18 Claims, 6 Drawing Sheets

CLASSIFICATION OF DATA IN A HIERARCHICAL DATA STRUCTURE

BACKGROUND OF THE INVENTION

1. Field of the Invention

The present invention is generally related to data security, and more specifically to data classification.

2. Description of the Related Art

Modern business organizations maintain and analyze large amounts of data regarding their consumers, consumer behavior, markets in which products are sold, etc. Some of the data maintained by the organizations may be sensitive, for example, consumer social security numbers, bank account numbers, credit card information, health records, insurance data, and the like. Protection of such sensitive information may be crucial to assuring customers of the organization that their identities are safe. For example, most organizations that offer credit cards implement the Payment Card Industry Data Security Standard (PCI DSS) to prevent credit card fraud and other security vulnerabilities and threats while processing credit card transactions. Data security has also been emphasized by several recent regulations such as the Health Insurance Portability and Accountability Act (HIPAA) and the Sarbanes-Oxley Act. Generally, the data security standards and regulations require that data be provided only on a "need to know" basis. That is, access to data is given only to those individuals that "need to know" the data.

SUMMARY OF THE INVENTION

The present invention is generally related to data security, and more specifically to data classification.

One embodiment of the invention provides a computer implemented method for classifying data objects arranged in one or more nodes of a hierarchical data structure. The method generally comprises receiving a selection of a first data classification from a plurality of predefined data classifications, and for each node of the hierarchical data structure, determining a probability that the node comprises one or more unclassified data objects related to the selected first data classification. The probability is determined by at least one of a distance between the node and one or more first nodes of the hierarchical data structure that are classified as the first data classification, and a first score based on a distance between the node and one or more second nodes of the hierarchical data structure that are classified as the first data classification. The method further comprises displaying the determined probability of each node in a graphical user interface (GUI).

Another embodiment of the invention provides a computer readable storage medium comprising a program product which, when executed by a processor is configured to perform an operation for classifying data objects arranged in one or more nodes of a hierarchical data structure. The operation generally comprises receiving a selection of a first data classification from a plurality of predefined data classifications, and for each node of the hierarchical data structure, determining a probability that the node comprises one or more unclassified data objects related to the selected first data classification. The probability is determined by at least one of a distance between the node and one or more first nodes of the hierarchical data structure that are classified as the first data classification, and a first score based on a distance between the node and one or more second nodes of the hierarchical data structure that are classified as the first data classification. The operation further comprises displaying the determined probability of each node in a graphical user interface (GUI).

Yet another embodiment of the invention provides a system generally comprising a memory and a processor. The memory generally comprises a hierarchical data structure comprising data objects arranged in one or more nodes, and a data classification program configured to classify unclassified data objects into at least one of a plurality of predefined data classifications. The processor, when executing the data classification program, is generally configured to receive a selection of a first data classification from the plurality of predefined data classifications, and for each node of the hierarchical data structure, determine a probability that the node comprises one or more unclassified data objects related to the selected first data classification. The probability is determined by at least one of a distance between the node and one or more first nodes of the hierarchical data structure that are classified as the first data classification, and a first score based on a distance between the node and one or more second nodes of the hierarchical data structure that are classified as the first data classification. The processor is further configured to display the determined probability of each node in a graphical user interface (GUI).

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is generally related to data security, and more specifically to data classification. The nodes of a hierarchical data structure may be displayed in a graphical user interface (GUI). The GUI may be configured to receive selection of a data classification type. Upon receiving a selection of a data classification type, a probability of a node containing data objects that may be classified as the selected data classification type may be displayed adjacent to the node, thereby allowing efficient location and classification of the data objects.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

Figure 1:
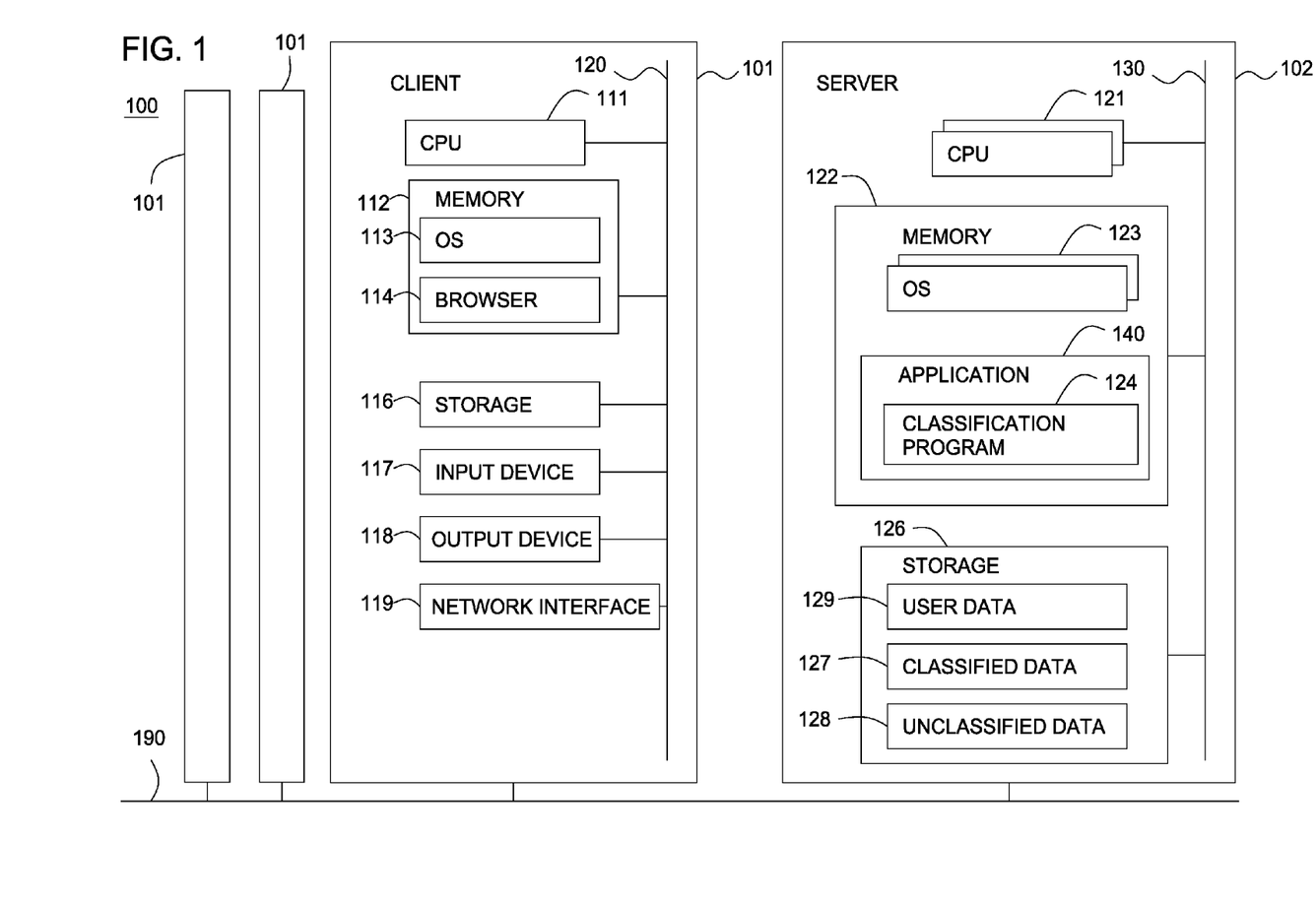
FIG. 1 illustrates an exemplary system according to an embodiment of the invention.

FIG. 1 depicts a block diagram of a networked system 100 in which embodiments of the invention may be implemented. In general, the networked system 100 includes a client (e.g., user's) computer 101 (three such client computers 101 are shown) and at least one server 102 (one such server 102 shown). The client computers 101 and server 102 are connected via a network 190. In general, the network 190 may be a local area network (LAN), a metropolitan area network (MAN), a wide area network (WAN), or the like. In a particular embodiment, the network 190 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 190. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 may include a browser program 114 which, when executed by CPU 111, provides support for browsing content available at a server 102 or another client computer 101. In one embodiment, browser program 114 may include a web-based Graphical User Interface (GUI), which allows the user to display Hyper Text Markup Language (HTML) information. In one embodiment, the GUI may be configured to allow a user to create a search string, request search results from a server 102 or client computer 101, and display search results. More generally, however, the browser program 114 may be a GUI-based program capable of rendering any information transferred from a client computer 101 and/or server 102.

The server 102 may by physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102.

In one embodiment, server 102 may be a logically partitioned system, wherein each logical partition of the system is assigned one or more resources, for example, CPUs 121 and memory 122, available in server 102. Accordingly, in one embodiment, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

The memory 122 further includes one or more applications 140. The applications 140 may be software products comprising a plurality of instructions that are resident at various times in various memory and storage devices in the computer system 100. When read and executed by one or more processors 121 in the server 102, the applications 140 may cause the computer system 100 to perform the steps necessary to execute steps or elements embodying the various aspects of the invention. In one embodiment, the applications 140 may include a classification program 124, which is discussed in greater detail below.

Storage 126 may include data that is accessed by and operated on by the applications 140. In one embodiment, the access and modification of data in the storage device 126 may be performed by the applications 140 in response to user input. For example, a user may initiate the browser program 114 and access or modify data in the storage device 126 via an application 140. The application 140 may be configured to display the data in the browser program 114 to facilitate user access and modification.

In one embodiment of the invention, storage 126 may include classified data 127, unclassified data 128, and user data 129. The classified data 127 and unclassified data 128 may include data objects, for example, documents, spreadsheets, images, voice files, applications, directories, and the like. Classified data may include data objects that have associated metadata describing the data objects. For example, in one embodiment, classified data 127 may include data records that include metadata defining accessibility of the data records by users. Accessibility of data in the storage device 126 may be restricted for various reasons. For example, a data security standard such as the PCI DSS standard, or a regulation such as the Sarbanes Oxley Act, may require that the data in the storage device 126 be only be displayed to particular individuals based on, for example, the sensitivity of the data.

In one embodiment of the invention, data classification may involve classifying data into one or more security levels. Exemplary data classification may include, for example, Level 1 data, Level 2 data, Level 3 data, and the like, wherein the level numbers indicate an increasing or decreasing sensitivity of the data. Alternatively, a color code, alphabet code, or the like may also be used to classify the data.

In another embodiment, the metadata may include a description of a type of individual having access to the data object. For example, an organization may include several departments such as human resources, accounting, sales, engineering, and the like. Each department may have data associated with the department. It may be desirable to limit accessibility of such data only to members of the department. Accordingly, in one embodiment, the metadata may describe a department to which the data belongs, for example, human resources data, accounting data, sales data, engineering data, and the like. In some embodiments, access to data may be determined by a designation (or role) of an individual within an organization. For example, access to data may be determined based on whether an individual is a president, vice president, director, manager, employee, janitor, in the organization. Accordingly, the data may be classified based on the designations, for example, director data, manager data, employee data, and the like.

In some embodiments, each record of data may include more than one classification. For example, data that may be accessed by employees may also be accessed by managers. Accordingly, a given object of data may be classified as both, employee data and manager data, in one embodiment.

Unclassified data 128 may include data that is yet to be classified. In other words, unclassified data may include data objects that do not have metadata describing the accessibility of the data object. For example, unclassified data may include data objects that are created by a user using client computer 101 or by an application 140 and stored in the storage 126, wherein the user or application did not include a classification for the data object.

In one embodiment, the unclassified data 128 may include sensitive information. For example, a person applying for a credit card may create unclassified data 128 including, for example, his/her social security number. The person creating the sensitive unclassified data 128 may not include metadata describing accessibility of the data. Therefore, the unclassified data 128 may have to be classified at a later time.

In one embodiment of the invention, data contained in the storage device 126 may be either structured data or unstructured data. Structured data objects may include data that is related based one or more predefined relations, schema, attributes, and the like. For example, a table or spreadsheet may be organized into rows and columns, and may include one or more fields that define a particular type of data. For example, a spreadsheet may have a first column containing first names, a second column containing last names, a third column containing addresses, and the like. Structured data may also include linked lists, binary trees, and the like. Unstructured data may be any data without structure, for example, images, text files, sound files, and the like. In other words, there may be no predefined relationship between data within an unstructured data record.

User data 129 may generally be any data describing users of the system. For example, in one embodiment, user data 129 may include an organizational chart. An organizational chart may include information such as, for example, names of individuals, job titles, supervisors of individuals, and the like. In one embodiment, the user data 129 may also include one or more user profiles. User profiles may be profiles associated with one or more individuals in an organizational chart. In one embodiment, the user profiles may provide user names and passwords to access one or more services provided by the system, for example, email, local area network (LAN) access, internet access, database access, and the like.

In one embodiment of the invention, user data 129 may include user data access classifications, referred to hereinafter simply as 'user classifications'. User classifications may define a role for each user of the system, for example, the users in an organizational chart. For example, users in a hospital system may be classified as 'doctors', 'nurses', 'lawyers', and the like. In one embodiment of the invention, user access to data, for example, classified data 127 and unclassified data 128, may be limited based on a user's role within the organization. For example, in a hospital, only 'doctors' and 'nurses' may have access to patient records, but the 'lawyers' may not have such access. By limiting user access to data based on a user's role within the organization, greater data security based on a 'need to know' standard may be achieved. In some cases, such limitations on user access to data may be necessary to comply with a data security standard such as the PCI DSS standard, or a regulation such as the Sarbanes Oxley Act.

By providing user classifications 129 and classified data 127, embodiments of the invention may facilitate implementation of natural language security policies. For example, in some embodiments, the storage device 126 may include a list of security "actions" that may be performed by users on data. Examples of actions may include, for example, view, edit, copy, etc. Therefore, natural language policies, for example, "Only Doctors can View Patient Records" may be written, wherein "Doctors" is a user classification, "Patient Records" is a data classification, and "View" is a type of action that may be performed on data.

However, in order to effectively implement security policies, it is desirable that data in the server 102 be properly classified. Traditionally, classification of unclassified data has been a manual process in which one or more individuals find, analyze, and classify each object of unclassified data 128 in the storage 126. For example, the classified data 127 and 128 may exist at various locations/nodes of a data tree. In one embodiment, the classified data 127 and unclassified data 128 may exist in various directories and folders of a directory tree. Therefore, in order to classify unclassified data, an individual may have to view each folder in the directory tree, identify unclassified data, and classify the data. This process may be extremely tedious, time consuming, and inefficient. Furthermore, manual classification may result in exposing sensitive data to individuals not authorized to view the data, for example, to the person performing the classification.

While the classification program 124, classified data 127, and unclassified data 128 are shown as being within the storage device 126 of server 102, in alternative embodiments, the classification program 124, classified data 127, and unclassified data 128 may be contained in any device in the system 100, for example, memory 122 of server 102, memory 112 or storage 116 of client computer 101, and the like.

Furthermore, while embodiments are described herein with respect to a client/server model, this model is merely used for purposes of illustration. Persons skilled in the art will recognize other communication paradigms, all of which are contemplated as embodiments of the present invention. As such, the terms "client" and "server" are not to be taken as limiting.

Intelligent Data Classification

As discussed above, natural language based security policies work best when data in a system is properly classified. However, data classification is a tedious and time consuming process, particularly when dealing with large amounts of data. Furthermore, data may be continuously added and deleted from various locations in a system, which may make it difficult for an administrator or other authorized person (hereinafter referred to simply as administrators) to find and classify data. For example, an administrator may have to periodically browse through each directory of a directory tree to identify and classify data objects contained therein.

Embodiments of the invention make the data classification process more efficient by identifying nodes of a hierarchical data structure that are likely to include data objects related to a specified data type. For example, an administrator may want to find data objects related to accounting data in a directory tree. Accordingly, embodiments of the invention may facilitate identification of one or more directories of the directory tree that may contain accounting data. Therefore, the administrator may be able to quickly and efficiently find and classify data.

In one embodiment of the invention, the classification program 124 may be configured to generate a graphical user interface (GUI) displaying a hierarchical structure, for example, a directory tree. The directory tree may include system data, whether classified or unclassified. The GUI may allow an administrator to select a data classification type. Upon receiving a selection of a data classification type, data classification program 124 may identify nodes of the hierarchical structure that include unclassified data that may be related to the selected data classification type.

Figure 2:
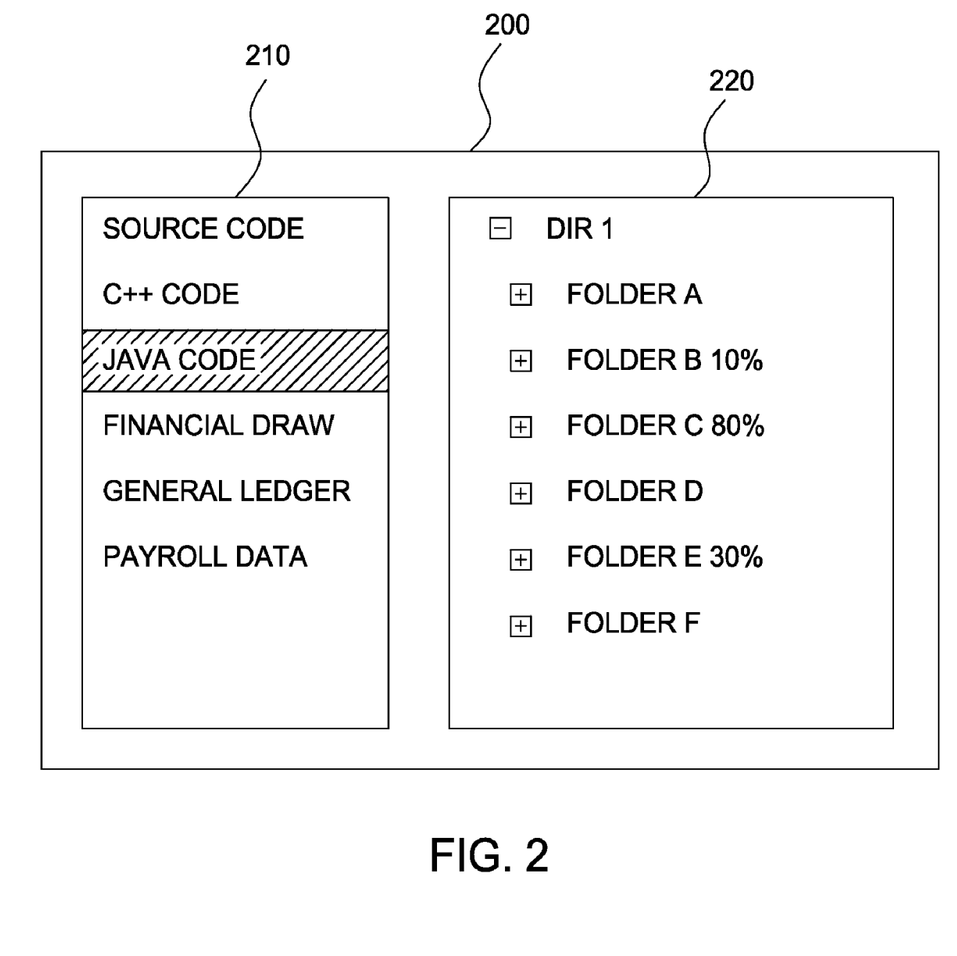
FIG. 2 is illustrates an exemplary graphical user interface (GUI) according to an embodiment of the invention.

FIG. 2 illustrates an exemplary GUI 200 according to an embodiment of the invention. As illustrated in FIG. 2, the GUI 200 may include at least a first area 210 and a second area 220. In a particular embodiment, the first and second areas may be panes arranged within the GUI. In one embodiment of the invention, the first area 210 may include a listing of one or more data classification types. For example, in FIG. 2, exemplary data classification types displayed include "Source code", "C++ code", "Financial data", "General ledger", and "Payroll data". One skilled in the art will recognize that the embodiments of the invention are not limited to the particular data classification types illustrated in the first area 210 of the GUI 200. Any number and kinds of data classification types, such as those discussed above with reference to the classified data 127 of FIG. 1, may be used in alternative embodiments.

In one embodiment, the second area 220 may include a graphical representation of a hierarchical data structure into which system data may be organized. The hierarchical data structure may be stored in, for example, the memory 122 or storage 126 illustrated in FIG. 1, and may include the classified data 127 and unclassified data 128. The second area 220 of GUI 200 illustrates a graphical representation of a directory tree, wherein the root directory is DIR1. The root directory DIR1 may include one or more subfolders, for example, folders A-F as illustrated in FIG. 2. Each of folders A-F may include one or more data objects, one or more subfolders, etc. Each of directory DIR1, the folders A-F, and their respective subfolders may represent a node of the hierarchical structure.

In one embodiment of the invention, the first area 210 may be configured to receive a selection of a data classification type. For example, the "Java code" data classification is shown as selected in the first area 210 as illustrated in FIG. 2. While selecting a data classification type from a list is illustrated in the first area 210 of GUI 200, in alternative embodiments, any other graphical tool (or tools), for example, radio buttons, drop down menus, text boxes, and the like may be used to receive selections of a data classification type.

Upon receiving a selection of a data classification type, the classification program 124 may identify one or more nodes of the hierarchical structure, illustrated in the second area 220, that are likely to contain data objects that may be related to the selected data classification type. In one embodiment of the invention, the classification program 124 may be configured to display a value representing a probability that a particular node contains data that may be related to the selected data classification type. For example, in FIG. 2, exemplary percentage values are indicated next to each depiction of a directory tree node (i.e. each folder). The percentage value may indicate a probability that the node contains data records related to the selected data classification type in the first area 210 such as "Java Code" (the selected data classification type in FIG. 2). For example, in FIG. 2, the greater the percentage value, the greater may be the probability that a respective node contains data records that may be classified as "Java Code". In particular, Folder C has the highest likelihood (80%) of containing "Java Code", as illustrated in FIG. 2. Based on the probability value, an administrator may be able to prioritize his effort in searching various sub-trees for data records related to the selected data classification type, thus greatly increasing the efficiency of his data classification efforts.

In one embodiment of the invention, if no indication, for example, a percentage value is provided next to a node to a node of the hierarchical structure, it may indicate that the node is not likely to contain data records related to the selected data classification type. For example, a percentage value is not provided next to Folder A. This may mean that data classification program 124 has determined that Folder A does not include (or is unlikely to include) data records associated with the selected data classification type, i.e. "Java Code". In alternative embodiments, an indication, for example, "0%" may be provided next to a folder that is deemed unlikely to contain data records related to a selected data classification type. This indication may save an administrator a large amount of time and effort since he may not go to the node's sub-tree to find the data records related to the selected data classification type.

In some embodiments, a value indicating the probability of a particular folder containing data records of a selected data classification type may be displayed only if the probability is greater than a threshold value. For example, in one embodiment, the probability value may be displayed only if the probability value is greater than 20%. The threshold value may be used to help increase the efficiency of the administrator's data classification efforts.

While the exemplary GUI of FIG. 2 illustrates displaying a percentage value next to a node to indicate a probability that the node comprises data records associated with a selected data classification type, in alternative embodiments, other means, for example, color codes, icons, highlighting, etc may also be used to indicate that a given node is likely to include data records relevant to the selected data classification type. For example, in a particular embodiment a color scale may be displayed in the GUI 200, wherein each color represents a different probability that the node comprises relevant data records. As an example, in one embodiment, the color red may indicate a high probability while the color blue may indicate a low probability. The choice of colors, icons, labels, highlighting, etc. to indicate the likelihood may be configurable, depending on the selected data classification type or other factors- driven policies.

In one embodiment of the invention, the data classification program may be configured to update the GUI 200 based on the interaction between an administrator and the hierarchical data structure displayed in the second area 220. For example, the administrator may expand or contract one or more directories and/or folders of the directory tree which may display additional sub directories and/or folders. In other words, GUI 200 may allow the administrator to hide or display additional nodes of the hierarchical structure displayed in the second area 220. In one embodiment, as additional nodes are displayed in GUI screen 200, the data classification program 124 may determine whether newly displayed nodes are likely to contain data records related to the selected data classification type in the first area 210.

Figure 3:
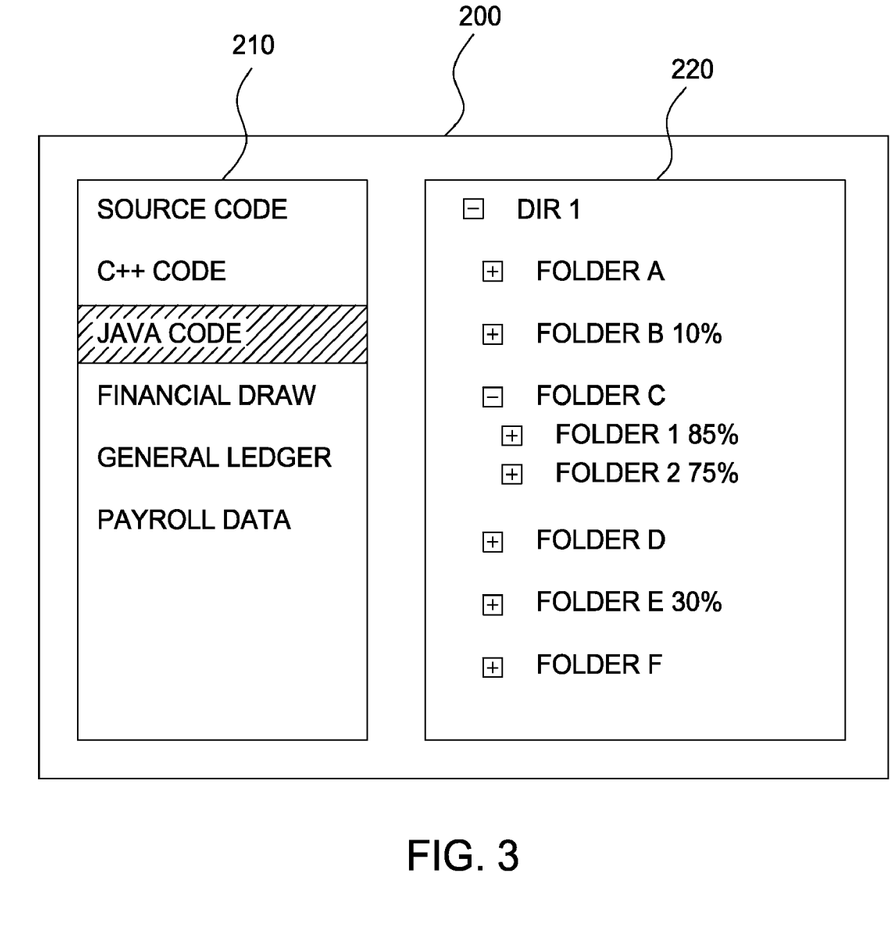
FIG. 3 illustrates another exemplary GUI according to an embodiment of the invention.

FIG. 3 illustrates the hierarchical structure of FIG. 3 after an administrator has interacted with the structure to expand the view of a given node. Specifically, FIG. 3 illustrates the second area 220 after Folder C has been expanded to display contents therein. As can be seen in FIG. 3, Folder C includes two subfolders, namely, Folder 1 and Folder 2. In some embodiments, a given folder may include data records in addition to subfolders. Accordingly, a listing of the data records contained in the folder may be provided in response to a folder being expanded. As can be seen in FIG. 3, upon expanding Folder C, data classification program may determine the likelihood of "Java Code" exists within the subfolders Folder 1 and Folder 2.

Exemplary Probability Determination

In some embodiments of the invention, the nodes of the hierarchical data structure may themselves be classified into one or more data classification types. For example, the folders A-F shown in FIGS. 2 and 3 may be classified as folders associated with any one of accounting data, sales data, marketing data, and the like. In one embodiment, the classification of the folders may be determined based on the contents of the folders. For example, the classification of each folder may be determined based on the classification of the data objects contained therein. As an example, if data objects contained in folder A are classified as accounting data, then folder A may also be classified as accounting data.

In one embodiment, the data classification program 124 may determine the classification of nodes in a hierarchical data structure. For example, in a directory tree, the data classification program 124 may be configured to determine the classification of the nodes, i.e., folders and subfolders, of the directory tree based on, for example, the contents of each node. Because the contents of each node may change over time, in one embodiment, the data classification program 124 may be configured to periodically analyze contents of the nodes and update the classification of each of the nodes of the hierarchical data structure. Data classification program may also be configured to update the classification of nodes of the hierarchical data structure dynamically whenever the contents of the node changes.

In one embodiment, if a given node comprises data objects belonging to more than one data classification type, then the data classification program 124 may be configured to determine the number of data objects associated with each of the data classification types found in each node. The classification of the node may be determined by the data classification type having the most number of data objects in the node. For example, if folder A includes 10 data objects classified as accounting data and 5 data objects classified as sales data, then folder A may be classified as accounting data. Alternatively, a folder may have more than one classification based on the objects contained therein. For example, folder A may be classified as accounting data and/or sales data. In some embodiments, data classification program 124 may classify a folder into a particular data classification type only if a threshold number of data records associated with the data classification type exist in the folder.

In some embodiments, each node of a hierarchical data structure may have a predefined classification. For example, an administrator may create a node/folder for use by the accounting department. Accordingly, at the time of creation of the node in the hierarchical data structure, the administrator may classify the node as accounting data.

In one embodiment of the invention, the probability of unclassified data records belonging to a selected data classification type existing in a given node of the hierarchical data structure may be determined based on the classification of one or more other nodes in the hierarchical data structure. For example, a subfolder of a parent folder that has been classified as "Accounting Data" may have a high likelihood of containing data objects that should be classified as "Accounting Data". However, a subfolder of a parent folder classified as "Source Code" may have a low likelihood of containing data objects that should be classified as "Accounting Data".

Figure 4:
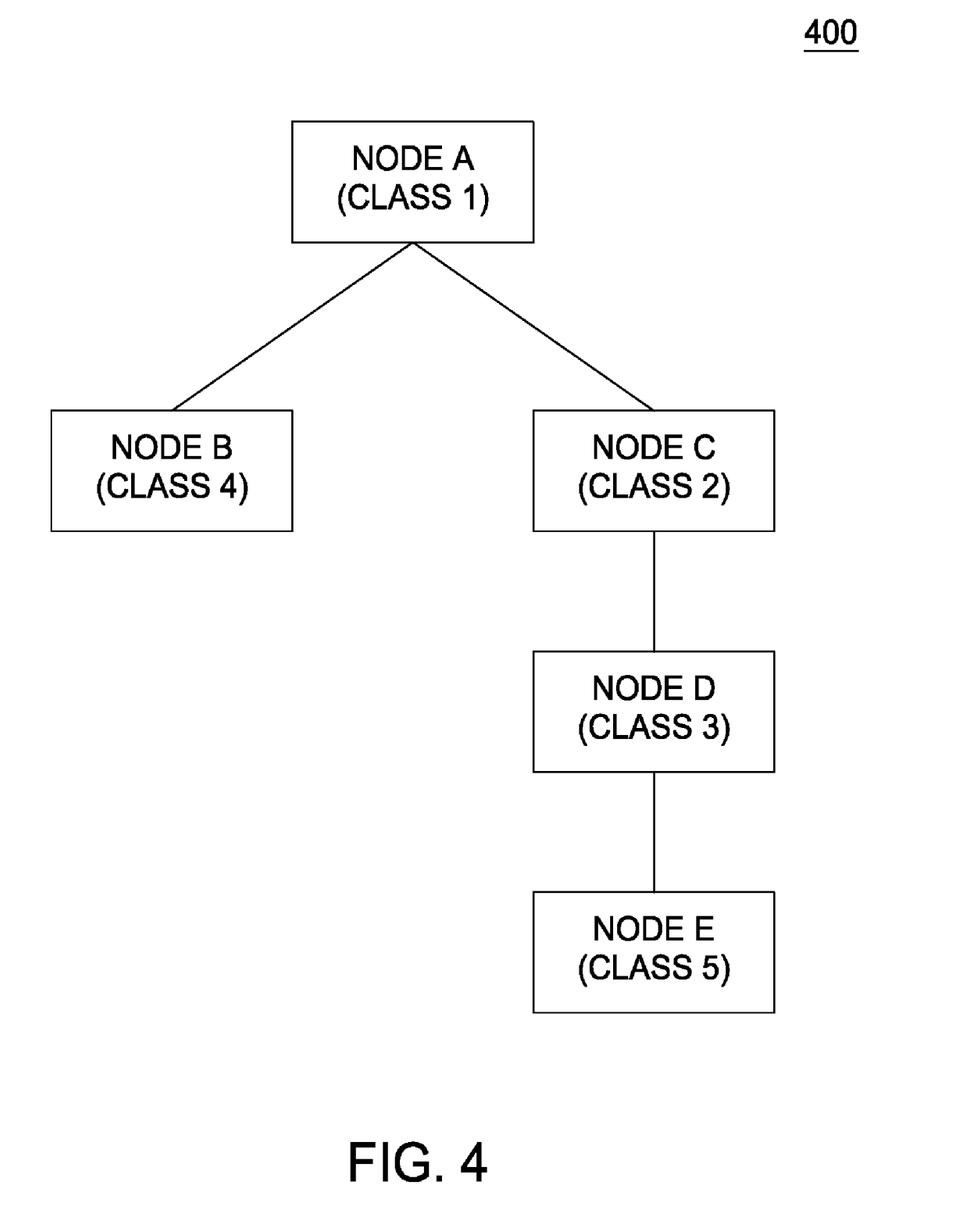
FIG. 4 illustrates an exemplary hierarchical data structure according to an embodiment of the invention.

In some embodiments of the invention, the probability of unclassified data records belonging to a selected data classification type existing in a given node of the hierarchical data structure may be determined based on a distance between the given node and one or more other classified nodes. FIG. 4 illustrates an exemplary hierarchical data structure 400 including nodes A-E. As illustrated in FIG. 4, Node A is a root node of the hierarchical data structure 400 and is classified as a "Class 1" node, wherein "Class 1" refers to a data classification type.

Further, as illustrated in FIG. 4, node B and node C are sub-nodes of node A. Node D is a sub-node of node C and node E is a sub-node of node E. Node B is classified as a "Class 4" node, node C is classified as a "Class 2" node, node D is classified as a "Class 3" node, and node E is classified as a "Class 5" node, as illustrated in FIG. 4. For purposes of this example, it is assumed that a user may desire to know the likelihood of data objects belonging to classes 1-4 existing in folder E. In one embodiment, because node D is one level away from node E, the distance between node D and E is assumed to be 1. Similarly, the distance between node E and node C is 2 because node C is two levels above node E, and the distance between node E and node A is 3 because node A is three levels above node E.

The distance between nodes E and B is 4 because to go from node E to node A requires traversing the hierarchical data structure from node B to node A, from node A to node C, from node C to node D, and node D to node E. Each traversal of the hierarchical data structure may represent a distance of 1, thereby resulting in a distance of 4 between node B and node E.

In one embodiment, the greater the distance between a classified node and a given node, the lower the likelihood that the given node includes data objects that may be classified into the same data classification type as the classified node. For example, if a user selects "Class 4" in a GUI, for example, the GUI 200, the likelihood of data objects that may be classified as "Class 4" data in node E may be relatively low because node B (which is classified as a "Class 4" node) is a relatively long distance away from node E. On the other hand, if the user selects "Class 3" in the GUI, the likelihood of node E including data objects that may be classified as "Class 3" objects may be high because node D (which is classified as a "Class 3" node) is relatively close to node E.

In one embodiment of the invention, the data classification program 124 may determine a score indicating the closeness of a given node to one or more other classified nodes that are mapped (or associated with) a selected data classification type. This score is referred to hereinafter as the mappable objects score. In one embodiment of the invention, the mappable objects score may be determined based on the following exemplary equation:

$$\frac{\frac{(\text{No. of successor nodes of the node mapped to data classification type or 1})}{(\text{total no. of successors})}}{(\text{shortest distance from the node to nodes mapped to data classification type})}$$

As illustrated in the above equation the mappable objects score may be obtained by first dividing a number of successor nodes of a given node that are mapped to selected data classification type or the number 1 by the total number of successors of the given node. The number 1 is selected in the numerator if the number of children of the given node mapped to a selected data classification type is zero. The dividend is then divided by the shortest distance between the given node and the nodes mapped to the selected data classification type.

Figure 5:
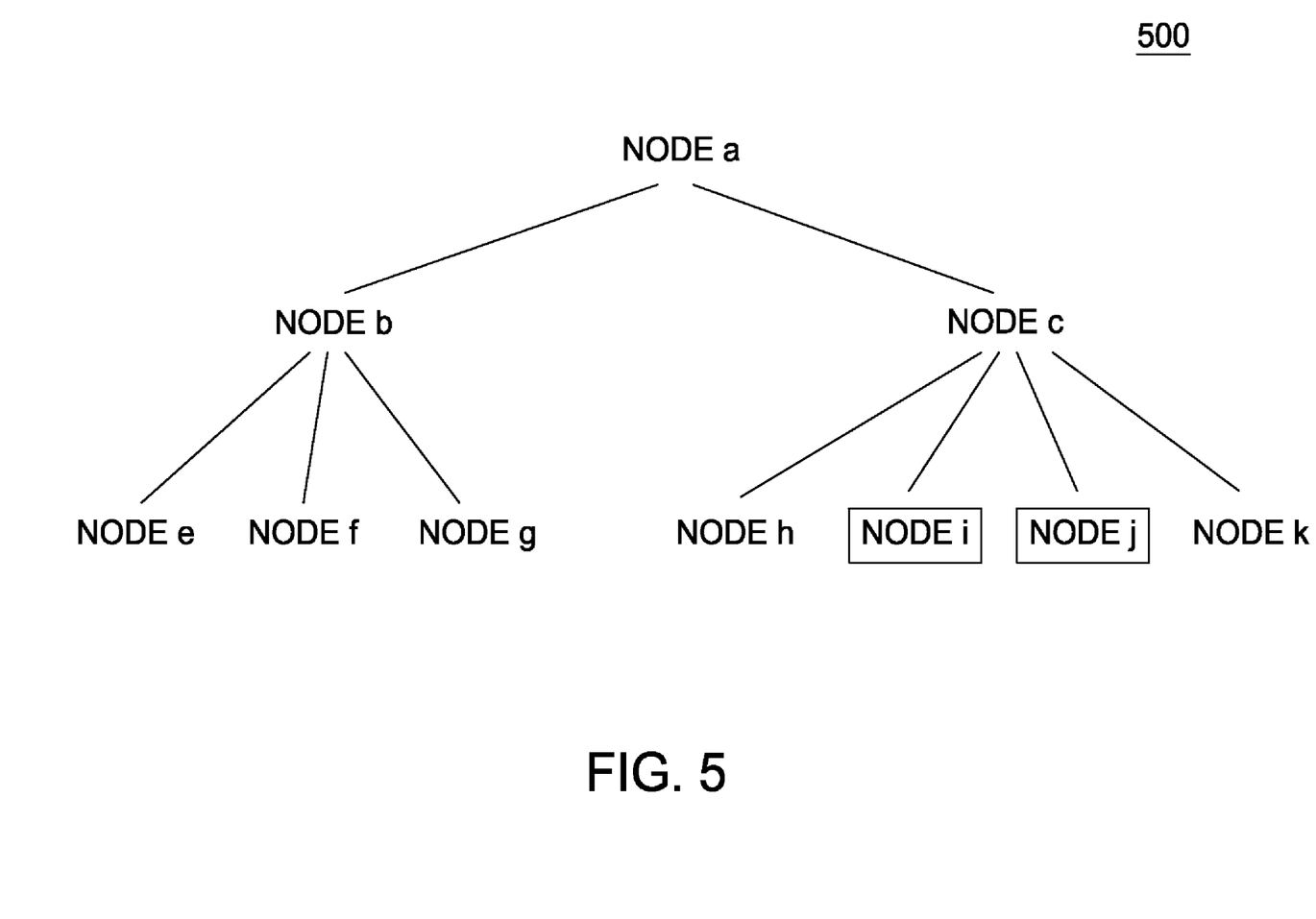
FIG. 5 illustrated another exemplary hierarchical data structure according to an embodiment of the invention.

FIG. 5 provides an exemplary hierarchical data structure 500 which is used for describing an exemplary mappable objects score calculations below. As illustrated in FIG. 5, the hierarchical data structure 500 includes nodes a-k. Nodes b and c are sub-nodes of node a, nodes e, f, and g are sub-nodes of node b, and nodes h, i, j, and k are sub-nodes of node c, as illustrated in FIG. 5. For the purposes of this example, nodes i and j are assumed to be classified as "general ledger" nodes. The mappable objects score calculations for "general ledger" using the equation provided above for nodes a, b, and c are provided in the following paragraphs.

For node c, the number of children is 4, i.e., nodes h, i, j, and k. The number of children of node c that are mapped to "general ledger" is 2, i.e., nodes i and j. The shortest distance between node c and the nodes mapped to "general ledger" is 1 because nodes i and j are one level below node c. Accordingly, plugging these numbers into the equation above, the mappable objects score for node c is (2/4)/1=0.5

For node b, the number of children is 3, i.e., nodes e, f and g. The number of children of node b that are mapped to "general ledger" is 0. The shortest distance between node b and the nodes mapped to "general ledger", i.e., nodes i and j, is 3. Accordingly, plugging these numbers into the equation above, the mappable objects score for node b is (1/3)/3=0.11. The number 1 is plugged into the equation instead of 0 (the number of children of node b mapped to "general ledger") so that a non-zero result may be obtained.

For node a, the number of children is 7, i.e., nodes e, f, g, h, i, j, and k. The number of children of node a mapped to "general ledger" is 2, i.e., nodes i and j. The shortest distance between node a and the nodes mapped to "general ledger" is 2 because nodes i and j are two levels below node a. Accordingly, plugging these numbers into the equation above, the mappable objects score for node a is (2/7)/2=0.14

In one embodiment of the invention, a greater mappable objects score may indicate that a given node is relatively closer to one or more nodes classified as a data classification type selected by the user. For example, in the above calculations node c has a higher mapabble objects score for "general ledger" because it is closer in distance to nodes i and j in comparison to nodes a and b.

Figure 6:
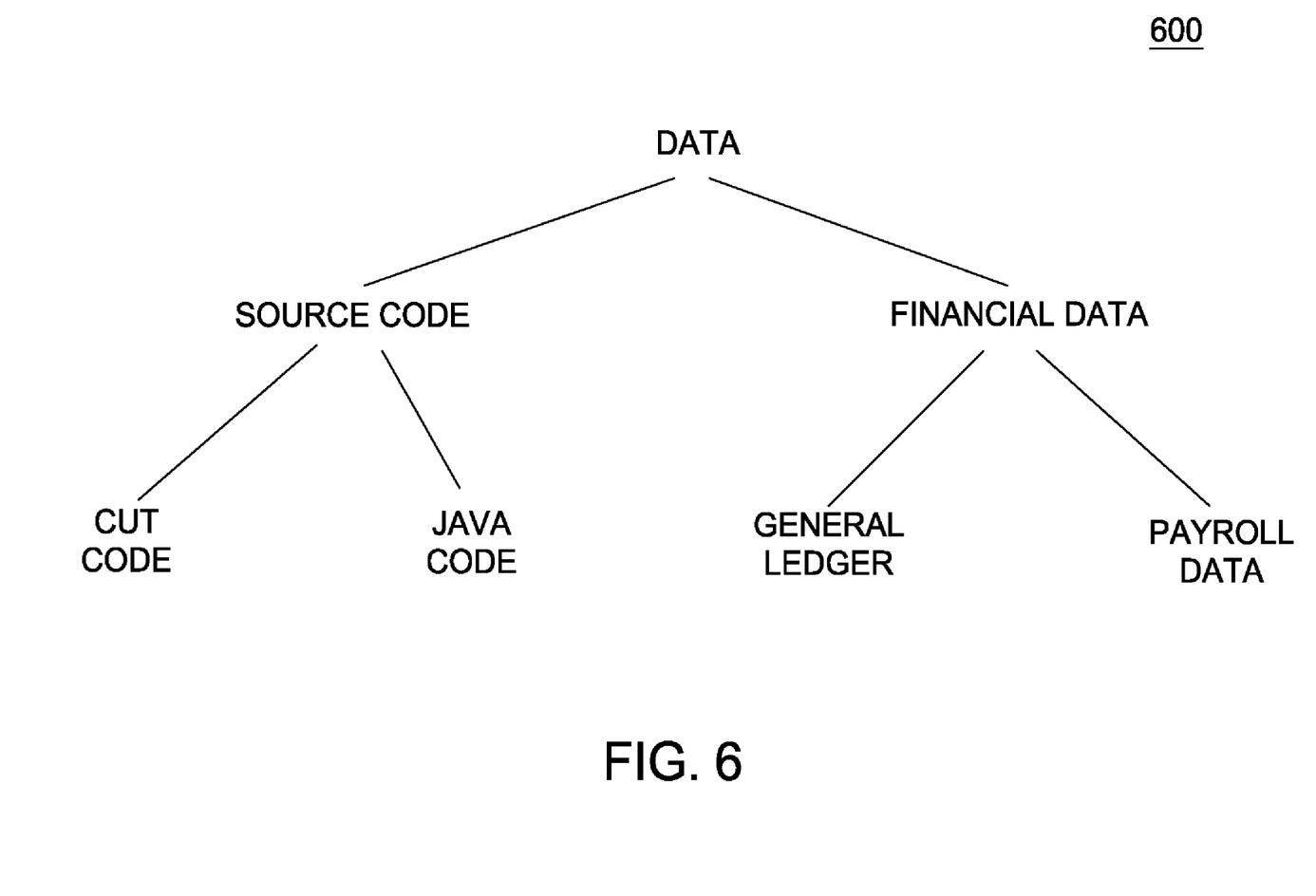
FIG. 6 illustrates a hierarchical relationships model according to an embodiment of the invention.

In some embodiments of the invention, the probability of unclassified data objects belonging to a selected first data classification type existing in a given node of the hierarchical data structure may be determined based on one or more other classified nodes associated with a second data classification type. For example, in one embodiment of the invention, the data classification types may be related according to a hierarchical relationship model. FIG. 6 illustrates an exemplary hierarchical relationships model 600 for exemplary data classification types, for example, "data", "source code", "financial data", "C++ code", "java code", "general ledger", and "payroll data". The hierarchical relationships model may be stored in, for example, memory 122 or storage device 126 illustrated in FIG. 1.

According to the hierarchical relationship model 600, "source code" and "financial data" are sub-classifications of "data", "C++ code" and "java code" are sub-classifications of "source code", and "general ledger" and "payroll data" are sub-classifications of "financial data". Based on the relationships between data classification types, as defined in the hierarchical relationships model 600, the probability of unclassified data objects belonging to a selected first data classification type existing in a given node of the hierarchical data structure may be determined based on one or more other classified nodes associated with a related second data classification type.

In one embodiment of the invention, the data classification program 124 may be configured to determine a term proximity score for comparing the closeness of any two data classification types in the hierarchical relationships model, for example, the model 600 illustrated in FIG. 6. In a particular embodiment, the term proximity score may be determined by dividing twice the depth of the hierarchical relationships model structure by the distance between the two terms in the hierarchical data structure. For example, the depth of the hierarchical relationships model 600 is 2 because, in the structure 600, two traversals are required to go from the root of the structure to the lowest level sub-node. As can be seen in FIG. 6, the distance between "payroll data" and "general ledger" is 2, as illustrated in FIG. 6. Accordingly, the term proximity score for "payroll data" and "general ledger" may be (2*2)/2=2. As another example, the distance between "payroll data" and "java code" is 4 as illustrated in FIG. 6. Accordingly, the term proximity score for "payroll data" and "java code" is (2*2)/4=1.

In one embodiment of the invention, the data classification program 124 may determine a hint score for each node of a hierarchical data structure based on the term proximity score and the mappable objects score. The hint score may indicate a likelihood of finding data objects related to a first data classification type in a given node based on one or more other data classification types. For example, in a particular embodiment, the hint score may be determined by multiplying the mappable objects score of a first data classification type for a given node with the term proximity score for the first data classification type and a second data classification type.

The hint score may indicate the likelihood that the given node comprises data objects related to the second data type. For example, referring to FIGS. 5 and 6, the hint score for folder b for the "payroll data" classification type, based on a comparison of "payroll data" and "general ledger" may be 0.11 (the mappable objects score for node b for "general ledger") multiplied by 2 (the term proximity score for "general ledger" and "payroll data"), which equals 0.22. In other words, based on the analysis of "general ledger" nodes, the likelihood of node b comprising data objects which may be classified as "payroll data" may be 0.22.

Similarly, the hint score for node c for the "payroll data" classification type, based on a comparison of "payroll data" and "general ledger" may be 0.5 (the mappable objects score for node c for "general ledger") multiplied by 2 (the term proximity score for "general ledger" and "payroll data"), which equals 1.

In one embodiment of the invention the hint score for a given node may be the greater of the hint score calculated according to the equation described above and the hint score of a child node. For example, the hint score for folder a for the "payroll data" classification type, based on a comparison of "payroll data" and "general ledger" may be 0.14 (the mappable objects score for node a for "general ledger") multiplied by 2 (the term proximity score for "general ledger" and "payroll data"), which equals 0.28. However, the hint score for node c, which is a child node of node a, is greater than 0.28. Accordingly, the hint score for node a may be the same as the hint score for node c, i.e. 1.

In one embodiment of the invention, the likelihood of finding data objects related to a first data classification type in a given node of a hierarchical data structure may be determined by determining an average of the hint scores for the first data classification type based on each of the other data classification types. For example, the likelihood of finding "payroll data" in node c of FIG. 5 may be determined by the average of the hint scores for folder c using each of the other data classification types in the hierarchical relationships model 600.

By providing a user with hints regarding locations in a hierarchical data structure where data objects that are likely to be classified as a selected data classification type, embodiments of the invention make the data classification process more efficient.

While the foregoing is directed to embodiments of the present invention, other and further embodiments of the invention may be devised without departing from the basic scope thereof, and the scope thereof is determined by the claims that follow.

What is claimed is:

1. A computer implemented method for classifying data objects arranged in one or more nodes of a hierarchical data structure, the method comprising:
   receiving a selection of a first data classification from a plurality of predefined data classifications;
   for each node of the hierarchical data structure, determining a probability that the node comprises one or more unclassified data objects related to the selected first data classification, wherein the probability is determined by a first score based on a traversal distance between the node and one or more first nodes of the hierarchical data structure that are classified as the first data classification, wherein the one or more first nodes are sub-nodes of the node, and wherein determining the first score comprises:
      determining a dividend by dividing a number of the one or more first nodes by a total number of sub-nodes of the node; and
      dividing the dividend by the traversal distance between the node and the one or more first nodes; and
   displaying the determined probability of each node in a graphical user interface (GUI).

2. The method of claim 1, wherein the GUI comprises a selection area displaying the plurality of predefined data classifications, and wherein the selection of the first data classification is received from the selection area.

3. The method of claim 1, wherein the GUI comprises a selection area displaying one or more nodes of the hierarchical data structure.

4. The method of claim 1, wherein determining the probability further comprises determining a second score indicating a relation between the first data classification and a second data classification based on locations of the first data classification and the second data classification in a hierarchical relationship model defining relations between the predefined data classifications.

5. The method of claim 4, wherein determining the probability further comprises multiplying the first score and the second score.

6. The method of claim 1, further comprising classifying one or more unclassified data objects as any one of the predefined plurality of data classifications based on the displayed probability, wherein the classification of the one or more data objects facilitates implementation of abstract policy statements for limiting access to data.

7. A computer readable storage medium comprising a program product which, when executed by a processor, is configured to perform an operation for classifying data objects arranged in one or more nodes of a hierarchical data structure, the operation comprising:

receiving a selection of a first data classification from a plurality of predefined data classifications;

for each node of the hierarchical data structure, determining a probability that the node comprises one or more unclassified data objects related to the selected first data classification, wherein the probability is determined by a first score based on a traversal distance between the node and one or more first nodes of the hierarchical data structure that are classified as the first data classification, wherein the one or more first nodes are sub-nodes of the node, and wherein determining the first score comprises:

determining a dividend by dividing a number of the one or more first nodes by a total number of sub-nodes of the node; and dividing the dividend by the traversal distance between the node and the one or more first nodes; and displaying the determined probability of each node in a graphical user interface (GUI).

8. The computer readable storage medium of claim 7, wherein the GUI comprises a selection area displaying the plurality of predefined data classifications, and wherein the selection of the first data classification is received from the selection area.

9. The computer readable storage medium of claim 7, wherein the GUI comprises a selection area displaying one or more nodes of the hierarchical data structure.

10. The computer readable storage medium of claim 7, wherein the operation further comprises classifying one or more unclassified data objects as any one of the predefined plurality of data classifications based on the displayed probability, wherein the classification of the one or more data objects facilitates implementation of abstract policy statements for limiting access to data.

11. The computer readable storage medium of claim 7, wherein determining the probability further comprises determining a second score indicating a relation between the first data classification and a second data classification based on locations of the first data classification and the second data classification in a hierarchical relationship model defining relations between the predefined data classifications.

12. The computer readable storage medium of claim 11, wherein determining the probability further comprises multiplying the first score and the second score.

13. A system comprising:
memory comprising:
a hierarchical data structure comprising data objects arranged in one or more nodes; and
a data classification program configured to classify unclassified data objects into at least one of a plurality of predefined data classifications; and
a processor which, when executing the data classification program, is configured to:
receive a selection of a first data classification from the plurality of predefined data classifications;
for each node of the hierarchical data structure, determine a probability that the node comprises one or more unclassified data objects related to the selected first data classification, wherein the probability is determined by
a first score based on a traversal distance between the node and one or more first nodes of the hierarchical data structure that are classified as the first data classification, wherein the one or more first nodes are sub-nodes of the node, and wherein determining the first score comprises:
determining a dividend by dividing a number of the one or more first nodes by a total number of sub-nodes of the node; and
dividing the dividend by the traversal distance between the node and the one or more first nodes; and
display the determined probability of each node in a graphical user interface (GUI).

14. The system of claim 13, wherein the GUI comprises a selection area displaying the plurality of predefined data classifications, and wherein the selection of the first data classification is received from the selection area.

15. The system of claim 13, wherein the GUI comprises a selection area displaying one or more nodes of the hierarchical data structure.

16. The system of claim 13, wherein the processor is further configured to classify one or more unclassified data objects as any one of the predefined plurality of data classifications based on the displayed probability, wherein the classification of the one or more data objects facilitates implementation of abstract policy statements for limiting access to data.

17. The system of claim 13, wherein the memory further comprises a hierarchical relationship model defining relations between the predefined data classifications, and wherein the processor is configured to determine the probability by determining a second score indicating a relation between the first data classification and a second data classification based on locations of the first data classification and the second data classification in the hierarchical relationship model.

18. The system of claim 17, wherein the processor is configured to determine the probability by multiplying the first score and the second score.

* * * * *